(12) United States Patent
Apostolos et al.

(10) Patent No.: US 6,366,627 B1
(45) Date of Patent: Apr. 2, 2002

(54) COMPRESSIVE RECEIVER WITH FREQUENCY EXPANSION

(75) Inventors: John T. Apostolos, Merrimack; Chester E. Stromswold, Nashua, both of NH (US)

(73) Assignee: BAE Systems Information and Electronic Systems Integration, Inc., Nashua, NH (US)

(*) Notice: Subject to any disclaimer, the term of this patent is extended or adjusted under 35 U.S.C. 154(b) by 0 days.

(21) Appl. No.: 06/536,592

(22) Filed: Sep. 28, 1983

(51) Int. Cl.[7] .................. H04B 1/69; H04B 1/10; H04B 15/02

(52) U.S. Cl. .................. 375/350; 455/303; 455/307; 455/308; 375/130

(58) Field of Search .................. 375/1, 2.2, 2.1, 375/130–153, 316, 390, 343, 346, 350; 455/145, 148, 226, 303, 226.1, 226.4, 146, 147, 307, 308; 343/17.2 PC; 367/55; 342/89, 195, 196, 201–204, 128–132

(56) References Cited

U.S. PATENT DOCUMENTS

| | | |
|---|---|---|
| 2,779,869 A | 1/1957 | Gerks |
| 2,954,465 A | 9/1960 | White |
| 3,020,477 A | 2/1962 | Lewinstein |
| 3,112,452 A | 11/1963 | Kirkpatrick |
| 3,173,093 A | 3/1965 | Most et al. |
| 3,195,134 A | 7/1965 | Steiner |
| 3,283,080 A | 11/1966 | Caputi, Jr. |
| 3,354,456 A | 11/1967 | Caputi, Jr. |
| 3,363,248 A | 1/1968 | Nicodemus |
| 3,381,243 A | 4/1968 | Darlington |
| 3,382,460 A | 5/1968 | Blitz et al. |
| 3,452,429 A | 7/1969 | Liebscher |
| 3,465,247 A | 9/1969 | Kubo |
| 3,484,693 A | 12/1969 | Fong |
| 3,493,865 A | 2/1970 | Miller |
| 3,546,604 A | 12/1970 | White |
| 3,560,852 A | 2/1971 | Haskin et al. |
| 3,568,054 A | 3/1971 | Ross |
| 3,654,554 A | 4/1972 | Cook |
| 3,670,333 A | 6/1972 | Winn |
| 3,676,839 A | 7/1972 | Wohl et al. |
| 3,716,853 A | 2/1973 | La Follette |
| 3,743,942 A | 7/1973 | Carpenter |
| 3,764,999 A | 10/1973 | Simons et al. |
| 3,766,477 A | 10/1973 | Cook |
| 3,806,840 A | 4/1974 | Whitney et al. |
| 3,820,025 A | 6/1974 | Lahr et al. |

(List continued on next page.)

FOREIGN PATENT DOCUMENTS

DE      2549021      5/1977

OTHER PUBLICATIONS

Harrington, J.B. and Nelson, R.B., "Compressive Intercept Receiver Uses SAW Devices", SAW Series No. 5, 1974, pp 57–61.

Maines, J.D., Moule, G. L., Newton, C.O. and Paige, E.G.S., "A Novel SAW Variable–Frequency Filter", 1975 Ultrasonics Symposium Proceedings IEEE Cat. #75 CHO 994–4SU, pp 355–358.

Nudd, G.R. and Otto, O.W., "Chirp Signal Processing Using Acoustic Surface Wave Filters", 1975 Ultrasonics Symposium Proceedings, IEEE Cat. #75 CHO 994–4SU, pp 350–354.

*Primary Examiner*—Bernarr E. Gregory
(74) *Attorney, Agent, or Firm*—Scott J. Asmus; Vernon C. Maine (57) ABSTRACT

A compressive receiver including a dispersive delay line (10) and a frequency translator (16, 18) is preceded by signal compressors (22a–d) that record the incoming signals at one speed and play them back at a higher speed. This increases the frequency spread and provides greater frequency resolution at the output of the receiver.

49 Claims, 3 Drawing Sheets

U.S. PATENT DOCUMENTS

| | | | |
|---|---|---|---|
| 3,858,117 A | 12/1974 | Denny | |
| 3,872,293 A | 3/1975 | Green | |
| 3,880,147 A | 4/1975 | Gruenke et al. | |
| 3,886,551 A | 5/1975 | Hempling | |
| 3,898,591 A | * 8/1975 | Mortley et al. | 343/17.2 PC |
| 3,905,033 A | 9/1975 | Moore et al. | |
| 3,946,388 A | 3/1976 | Shifrine | |
| 3,982,101 A | 9/1976 | Kalb et al. | |
| 4,005,417 A | 1/1977 | Collins | |
| 4,017,860 A | 4/1977 | Earp | |
| 4,021,805 A | 5/1977 | Effinger et al. | |
| 4,028,700 A | 6/1977 | Carey et al. | |
| 4,037,159 A | 7/1977 | Martin | |
| 4,041,496 A | 8/1977 | Norris | |
| 4,054,873 A | 10/1977 | Parent | |
| 4,063,243 A | 12/1977 | Anderson et al. | |
| 4,112,430 A | 9/1978 | Ladstatter | |
| 4,121,191 A | * 10/1978 | Corkhill | 367/55 |
| 4,151,529 A | 4/1979 | Dorey | |
| 4,163,978 A | 8/1979 | Shepherd et al. | |
| 4,166,980 A | * 9/1979 | Apostolos et al. | 455/226 |
| 4,203,114 A | 5/1980 | Gerst et al. | |
| 4,204,165 A | * 5/1980 | Ready | 455/226 |
| 4,209,791 A | 6/1980 | Gerst et al. | |
| 4,216,475 A | 8/1980 | Johnson | |
| 4,247,939 A | * 1/1981 | Stromswold et al. | 455/303 |
| 4,254,417 A | 3/1981 | Speiser | |
| 4,263,597 A | 4/1981 | Bentley et al. | |
| 4,270,209 A | * 5/1981 | Albanese | 455/145 |
| 4,288,750 A | * 9/1981 | Newtow et al. | 343/17.2 PC |
| 4,296,389 A | 10/1981 | Fuller et al. | |
| 4,302,838 A | 11/1981 | Eng et al. | |
| 4,305,159 A | * 12/1981 | Stromswold et al. | 455/148 |
| 4,310,816 A | 1/1982 | Fuller | |
| 4,316,192 A | 2/1982 | Acoraci | |
| 4,333,080 A | 6/1982 | Collins et al. | |
| 4,336,511 A | 6/1982 | Stromswold et al. | |
| 4,338,605 A | 7/1982 | Mims | |
| 4,382,259 A | 5/1983 | Becavin et al. | |
| 4,446,566 A | * 5/1984 | Fuller | 455/145 |
| 4,604,626 A | 8/1986 | Stromswold | |
| 4,633,257 A | 12/1986 | Apostolos et al. | |
| 4,641,143 A | 2/1987 | Apostolos | |
| 4,646,099 A | 2/1987 | Apostolos | |
| 4,649,392 A | 3/1987 | Apostolos | 342/192 |
| 4,654,667 A | 3/1987 | Apostolos et al. | 342/445 |
| 4,656,642 A | 4/1987 | Apostolos et al. | 375/1 |
| 4,701,762 A | 10/1987 | Apostolos | 342/417 |
| 4,733,237 A | 3/1988 | Apostolos et al. | 342/13 |

* cited by examiner

COMPRESSIVE RECEIVER WITH FREQUENCY EXPANSION

BACKGROUND OF THE INVENTION

The present invention is directed to compressive receivers. It is particularly concerned with increasing the frequency resolution of such receivers.

A compressive receiver can be thought of as a spectrum analyzer or Fourier-transform device. The input to the compressive receiver is a time-dependent signal, and the output of the receiver is a waveform whose value at a given time indicates the presence of spectral components in the incoming signal at a frequency corresponding to the given time. That is, an input sine wave of a given frequency will result in an output pulse at a particular point in time as the output of the compressive receiver, while a sine wave of a different frequency will cause a pulse in the output at a different point in time.

The typical compressive receiver consists of a dispersive delay line fed by a linearly swept frequency translator, such as a mixer and a linearly swept local oscillator. The dispersive delay line is chosen to have a substantially linear relationship of delay to frequency; that is, the difference between the delays experienced by two simultaneous frequency components having a given frequency difference is proportional to the frequency difference.

The local oscillator is swept in frequency in a sawtooth manner at such a rate that mixer outputs caused by all signals of a given frequency occurring at the input port of the mixer during a single sweep arrive at the output port of the delay line at the same time. The time of arrival of a pulse at the delay-line output port is thus an indication of the frequency of the signal that gave rise to it.

A two-dimensional compressive receiver employs the same principle, but it uses a two-dimensional delay line having a set of input ports distributed along one edge and a set of output ports distributed along the opposite edge. In a typical application, the input ports are driven by elements of an antenna array. Each antenna element provides essentially a time-shifted version of the signals from the other antenna elements. Accordingly, interference patterns are set up within the delay line. The geometry of the two-dimensional delay line is such that, if there is a linear relationship between input-port position and the time delay of a signal arriving at the input port, the signals within the delay line caused by a particular frequency component will all constructively interfere at a particular point along the opposite edge of the delay line, the position of this point depending on the time difference between the various input signals. For instance, if signals of a given frequency all arrive at the same time, constructive interference of all those signals might occur at the center output port, while the point of constructive interference might be at one of the left output ports if the signals at the left input ports are delayed more than those at the right input ports. If the input ports are driven by elements of a linear antenna array, the position of the output port having the greatest signal is thus an indication of the direction of the source of the signal.

Regardless of whether the delay device is of one dimension or more dimensions, the frequency resolution of the device is equal to the reciprocal of the difference, T, between the delays of the lowest and highest frequencies that it can process in a single sweep of the local oscillator. That is, a single-frequency signal at the mixer input port will cause a delay-line output pulse whose duration is long enough to prevent it from being distinguished from a pulse caused by a single-frequency signal of a different frequency unless the difference between their frequencies is greater than 1T. In the past, the only way to increase frequency resolution was to increase T which means to increase the delay-line length.

It is an object of the invention to increase the frequency discrimination in a compressive receiver without increasing delay-line length.

SUMMARY OF THE INVENTION

The foregoing and related objects are achieved in a compressive-receiver system in which an input signal of a given input bandwidth is time-compressed before it is applied to the dispersive delay line. That is, the input signal is recorded for a given time interval and then played back at a faster speed so that the playback lasts for a shorter time interval. This applies the information to the delay line in a wider range of frequencies. Since the spread in frequency of the input to the delay line is increased, the spread in delay time for the input bandwidth is also increased. This increases the frequency resolution without lengthening the delay line.

BRIEF DESCRIPTION OF THE DRAWINGS

These and further features and advantages of the present invention are described in connection with the accompanying drawings, in which.

DETAILED DESCRIPTION OF THE PREFERRED EMBODIMENTS

The invention will be described in connection with a two-dimensional compressive receiver, although it will become apparent as the description proceeds that the teachings of the present invention can also be applied to one-dimensional receivers.

Figure 1:
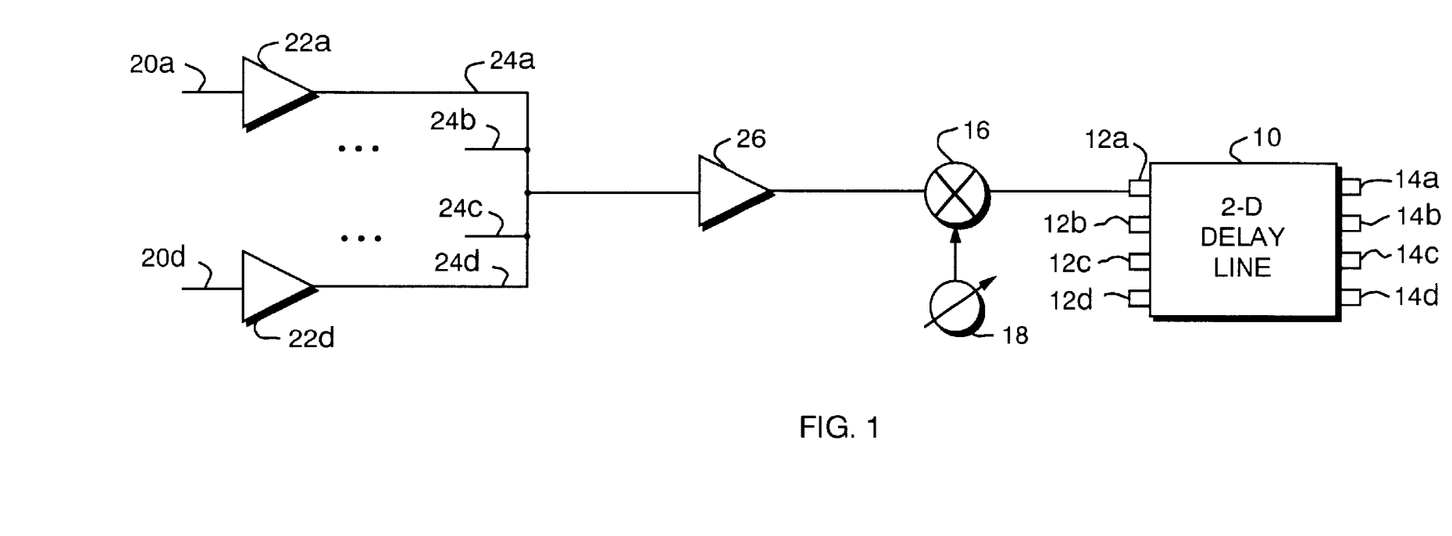
FIG. 1 is a schematic diagram of a compressive receiver employing the teachings of the present invention.

The two-dimensional compressive receiver includes a two-dimensional delay line 10 having a series of input ports 12a–12d arrayed along one edge, while a number of output ports 14a–14d are provided along the opposite edge. (The equality in number of the input and output ports in the illustrated embodiment is coincidental.)

A frequency translator consisting of a mixer 16 and a linearly swept local oscillator 18 feed input port 12a, while similar translators, not shown in the drawings, feed each of the input ports 12b–d.

A chirp signal produced by the linearly swept local oscillator 18 is mixed in the mixer 16 with a signal received from a signal path that begins with a signal line 20a. Line 20a carries a signal that typically is the filtered and frequency-translated output of an antenna element. Accordingly, the signal on line 20a falls within a given frequency band, say, between $f_1$ and $f_2$. A signal compressor 22a receives this band-limited signal. The signal compressor 22a is a device for recording the signal present on input line 20a and storing it until a time arrives for its stored signal to be played back. The stored signal is then played back at a higher rate. In the illustrated embodiment, the playback rate is four times the rate at which the signals were recorded. The result is that the information signal generated by the signal compressor 22a does not fall between the frequencies $f_1$ and $f_2$ but rather between $4f_1$ and $4f_2$. That is, the frequencies are higher, and, more importantly, the range of frequencies is wider.

The signal compressor 22a can be realized in many forms. For example, it can include a sampling circuit followed by an analog-to-digital converter that feeds the digitized data into a memory. The information is read out of the memory at a rate faster than that at which it was read in, converted back to analog form, and filtered by a filter 26 to restrict it to frequencies between $4f_1$ and $4f_2$, The filtered, time-compressed output of filter 26 is applied by the filter 26 to the mixer 16, where it is mixed with the chirp signal generated by the local oscillator 18. The output of the mixer 16 includes components whose frequencies are the differences between the frequencies of the time-compressed signal and those of the chirp signal. Since the input port 12a of the two-dimensional delay line 12 includes a transducer that is primarily sensitive to frequencies within this difference range, there is no need to filter out, e.g., sum-frequency components. In some circumstances, though, it may be necessary to insert a filter in the circuit to remove the unwanted components.

Accordingly, the mixer 16 and local oscillator 18 act as a frequency translator. Signals applied to the mixer 16 are translated downward in frequency. Since the frequency of the local oscillator sweeps repetitively in a sawtooth manner, the downward frequency translation of a given signal component increases throughout a given sweep of the local oscillator. The speed of propagation of a signal within the two-dimensional delay line 10 increases with decreasing frequency, so the frequency-translated version of a signal appearing at the input to mixer 16 is translated so that the portions of the signal arriving later are caused to propagate more rapidly through the two-dimensional delay line.

The rate at which the local oscillator 18 changes frequency is such that delay-line 10 signals caused by later-occurring portions of a given frequency component in the mixer input reach the output edge of the two-dimensional delay line at the same time as those caused by earlier portions of the same frequency components. Thus, the time of occurrence of a delay-line output depends on the frequency of the mixer input component that gave rise to it, not on the time during the sweep when the component occurred. The output signal plotted as a function of time is thus a plot of the frequency content of the mixer input.

The description so far has concentrated on the signal applied to input port 12a. However, a similar signal path leading from another antenna element is used to feed port 12b, and signals from further antenna elements feed ports 12c and 12d. The sources of the signals at these ports are typically separate elements of the same antenna array, so their signals are delayed versions of each other. The two-dimensional delay line 10 is arranged for constructive interference at points on its output edge determined by the spatial frequency of the ensemble of signals at its input ports. If there is a linear relationship between the phases of the signals caused by a given source and the positions of the input ports 12a–d at which they occur, there will be constructive interference at the output edge of the delay line 10 at a point determined by the proportionality constant of that linear relationship. The antenna elements are usually arranged in a line, although such an arrangement is not necessary for the purposes of this invention. If they are in the typical linear arrangement, and if the positions of the associated input ports 12a–12d correspond to this arrangement, then the linear delay relationship will obtain, and the position at which the signals constructively interfere will be an indication of the direction of the signal source. This is because the relative delays between the signals at the various input ports are determined by the direction from which the signals are received. The point of constructive interference is in turn determined by the relative delays and the frequency of the interfering components—i.e., it is determined by the spatial frequency at the delay-line input ports.

The compressive receiver as described so far provides a two-dimensional Fourier transform; there is a transformation from the time and position domains to the time- and spatial-frequency domains. According to the present invention, the time-frequency resolution of using the signal compressor 22a, which increased the difference between the arrival times of signals caused by inputs of different frequencies on line 20a.

In order to achieve this increase in resolution, it was necessary to restrict the input bandwidth, $f_2-f_1$, to one-fourth the delay-line bandwidth. To cover the same bandwidth as could have been covered without the signal compressor, four separate bands are processed sequentially. In addition to receiving signals from output line 24a of time compressor 22a, the filter 26 receives inputs at staggered intervals from other lines 24b–d from further time compressors. All of the time compressors that feed filter 26 receive signals from the same antenna element, but each of the lines 24a–d contains information from a different portion of the frequency spectrum of the antenna-element signal. This may be accomplished, for example, by inserting in each of the input lines 20a–20d a frequency translator that translates a different frequency band to the range from $f_1$ to $f_2$. The frequency translator would be followed by a bandpass filter, each bandpass filter having the same bandpass, from $f_1$ to $f_2$. Thus, the signals received by time compressors 22a–d are all in the same frequency range but originate in different portions of the frequency spectrum of the original antenna signal.

Figure 2:
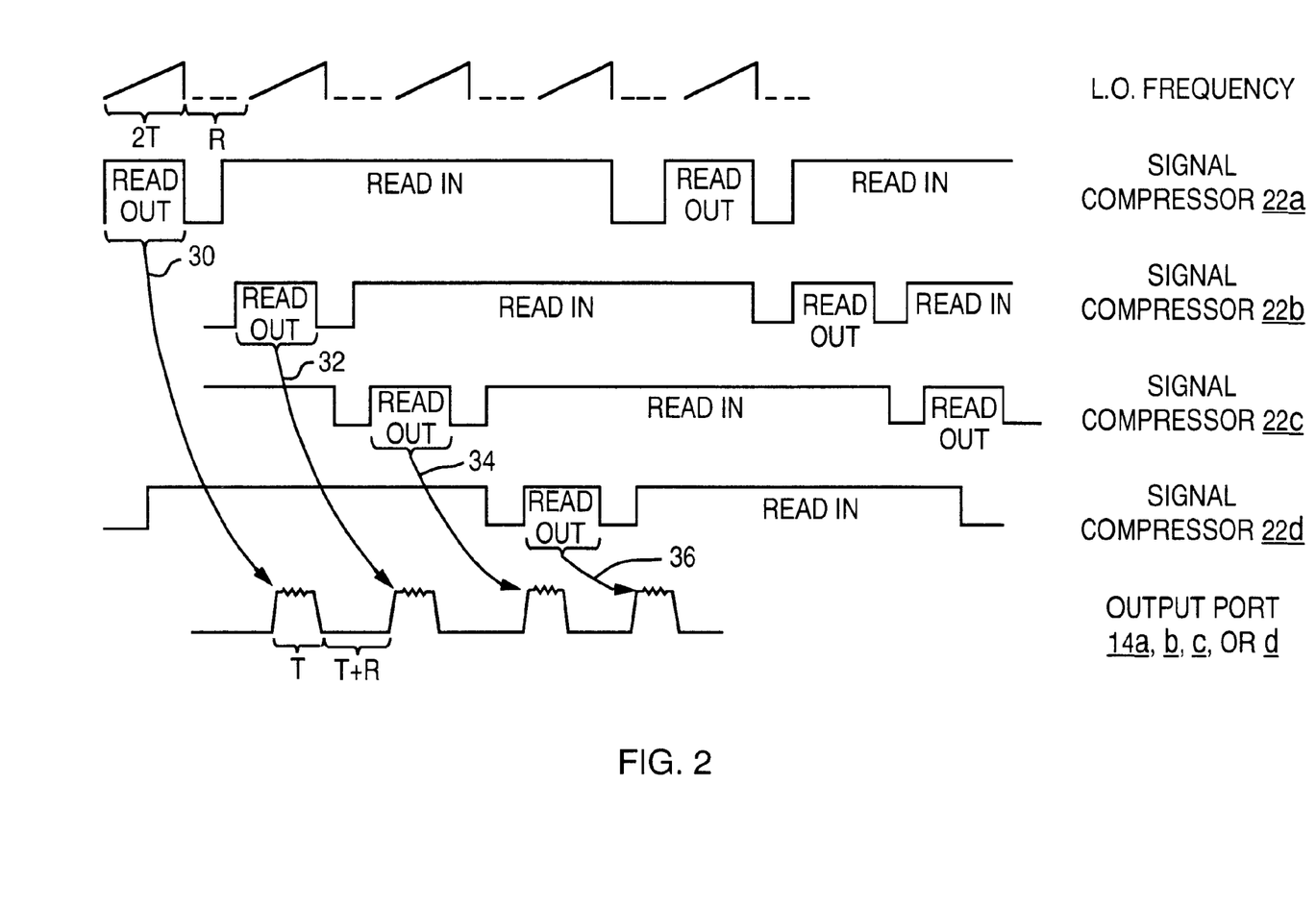
FIG. 2 is a timing diagram depicting signals at various points in the circuit of FIG. 1.

All of the time compressors 22a–22d may record signals concurrently, but they generate output signals at different times. This is illustrated in FIG. 2 which includes a plot of the frequency of the local oscillator 18 as a function of time. FIG. 2 also includes timing diagrams for reading in and reading out by the various signal compressors 22a–22d, and it depicts the output of the output port 14a, b, c, or d having the highest signal strength.

As the diagrams illustrate, the readout from signal compressor 22a is timed to occur during a sweep of the local oscillator. The sweep lasts for a period equal to 2T, where T is the difference in propagation time through the delay line 10 between the frequency-translated version of a signal at frequency $4f_1$ and that of a signal at frequency $4f_2$. An arrow 30 in FIG. 2 associates the readout from time compressor 22a with the resultant output of the compressive receiver. The delay-line output caused by a readout lasting for a duration of 2T lasts for a duration of T. This is because, due to the sweep of the local oscillator, signals arriving later at the mixer 16 take less time to propagate through the delay line 10 than do the earlier-arriving signals.

After signal compressor 22a has completed its readout, it begins to read information in again, as FIG. 2 indicates. In most embodiments of the present invention, this type of timing will be the easiest to realize. However, those skilled in the art will recognize that it is clearly possible to build a signal compressor that reads in and out simultaneously.

After a recovery time of length R, the local oscillator begins its sweep again, and the readout of time compressor 22b begins at the same time. An arrow 32 depicts the causal relationship between the output signal of signal compressor 22b and a portion of the output of the delay line. Similar arrows 34 and 36 depict the causal relationship between the outputs of the other compressors and other portions of the delay-line output. It will be noted that the read-in time for each signal compressor is 8T, or four times the read-out time. Thus, the frequency spread, as was observed above, is four times as great in the signal-compressed outputs as it is in their inputs.

Since the inputs to the time compressors 22a–d originate from different parts of the frequency spectrum of the antenna-element signals, successive outputs of the delay line represent different frequency bands, a given frequency band being repeated on every fourth output segment. Thus, the effective bandwidth of the circuit is not reduced by using the signal compressors.

Figure 3:
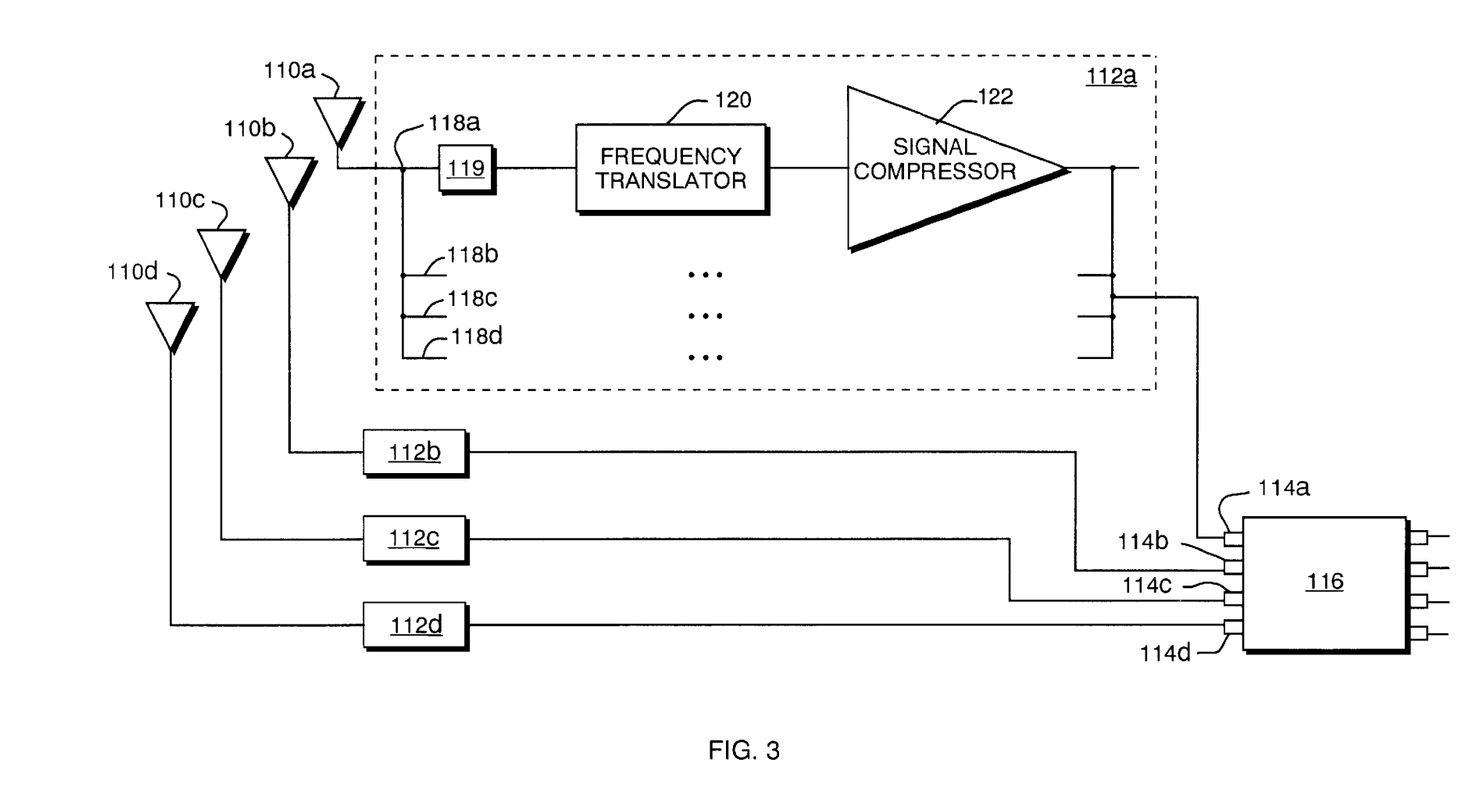
FIG. 3 is a block diagram of an alternate embodiment of the present invention.

In an alternate arrangement of the present invention, the frequency translation is performed before the time compression. This alternate arrangement is illustrated in FIG. 3, in which four antenna elements 110a–d of a linear antenna array feed input circuits 112a–d that in turn feed input ports 114a–d of a two-dimensional delay line 116 similar to delay line 10 of FIG. 1. Each input circuit is similar to input circuit 112a, which includes four branch lines 118a–d that carry a common signal from the same antenna element 110a.

Branch line 118a carries the antenna-element signal to a band-pass filter 119, which restricts the signal from the antenna to a particular pass band. Similar filters are present in the other lines 118b–d, but each of these filters passes a different band. The input circuits 112b–d have similar branches whose band-pass filters having the same pass bands as those in input circuit 112a.

A frequency translator 120 is similar to the combination of the mixer 16 and local oscillator 18 of FIG. 1. If necessary, the frequency translator 120 may also include appropriate filtering to remove sum frequencies or other unwanted components. Like the corresponding elements in FIG. 1, the frequency translator 120 sweeps in frequency at such a rate that all signals in the delay line 10 generated during one translator sweep from a given frequency in the antenna signal arrive at an output port of the delay line 116 at the same time. That is, the sweep rate of the frequency translator 120 is chosen so that the circuit will operate as a compressive receiver. However, the rate at which the translator sweeps is only one-quarter that at which the local oscillator 18 of FIG. 1 sweeps. This is because the output of the frequency translator 120 is compressed in time—and thus expanded in frequency—by a signal compressor 122, so the frequency sweep is multiplied by four.

The frequency translators in the other lines 118b–d of input circuit 112a sweep at the same rate as frequency translator 120 does. However, the ranges through which they sweep differ in accordance with the band-pass filters in their respective branch lines so that their output signals will all fall within the same frequency range. These signals on the several lines are then fed to signal compressors similar to the signal compressor 122 in branch line 118a. Like the signal compressors in FIG. 1, the signal compressors 122 read out their signals at staggered times at rates that are four times the rates at which the signals were originally recorded. Processing in the two-dimensional delay line 116 is then performed in the same manner as that in which processing is performed in the two-dimensional delay line 10 of FIG. 1.

It is thus apparent that, by following the teachings of the present invention, it is possible to increase the frequency resolution of a compressive receiver significantly.

We claim:

1. A compressive-receiver circuit comprising:
   A. a dispersive delay line having an input port and an output port and having a substantially linear relationship between the frequency of a signal and the delay time required for that signal to travel from the input port to the output port; and
   B. an input circuit including a time compressor and a frequency translator in series, said time compressor being connected to provide a time compressed signal to said frequency translator, for generating and applying to the input port of said delay line an output generated by time compressing an input signal and frequency translating it by a frequency that sweeps repeatedly at such a rate that all components of the output signal derived from a given frequency component of the input signal and translated during a given sweep of the frequency translator arrive at the output port of the delay line at substantially the same time while those derived from different frequency components arrive at different times, the difference between the times of arrival at the delay-line output port of signals caused by different-frequency signals at the signal-compressor input port thereby being greater than it would be without the time compression.

2. A compressive-receiver circuit as recited in claim 1 wherein said dispersive delay line comprises a two-dimensional dispersive delay line.

3. A compressive-receiver circuit as recited in claim 1 wherein said time compressor comprises:
   a sampling circuit receiving signals to be time compressed; and
   an analog-to-digital converter, receiving signals from said sampling circuit, for providing digitized signals to said memory.

4. A compressive-receiver circuit as recited in claim 1, further comprising:
   a filter operatively connected to the input of said input circuit.

5. A compressive-receiver circuit as recited in claim 1, further comprising:
   a plurality of input circuits, each connected to an input port of said delay line and each including a frequency translator and a time compressor connected one to the other in series.

6. A compressive-receiver circuit as recited in claim 5 wherein for each said input circuit said frequency translator and said time compressor are connected in series such that the output of said time compressor is connected to the input of said frequency translator.

7. A compressive-receiver circuit as recited in claim 6, further comprising:
   a filter operatively connected between said time compressor and said frequency translator.

8. A compressive-receiver circuit as recited in claim 6 wherein said input circuit comprises a plurality of time compressors, each providing signals to the input of said frequency translator.

9. A compressive-receiver circuit as recited in claim 8, further comprising:
   a like plurality of bandpass filters, each operatively connected to the input of one of said time compressors; and
   a like plurality of frequency translators, each operatively connected to provide signals to one of said plurality of bandpass filters.

10. A compressive-receiver circuit as recited in claim 5 wherein said dispersive delay line comprises a multi-dimensional dispersive delay line.

11. A compressive-receiver circuit as recited in claim 5, further comprising:

control means, connected to each of said input circuits, for staggering output signals of said input circuits.

12. In a compressive-receiver circuit including:
A. a dispersive delay line having an input port and an output port and having a substantially linear relationship between the frequency of a signal and the delay time required for that signal to travel from the input port of the delay line to its output port; and
B. a frequency translator having an input port and an output port connected to provide as an input to the delay line a translated signal whose frequencies differ from those at the frequency-translator input port by a difference frequency that is repeatedly swept at a rate corresponding to the relationship between frequency and delay-line delay so that the translated signals caused by all signals of a given frequency that reach the frequency translator within a given sweep thereof arrive at the output port of the delay line at substantially the same time while those of different frequencies arrive at different times so that the time of occurrence of an output of the dispersive delay line is an indication of the frequency content of the signals received at the frequency-translator input port and causing that output, the improvement comprising:
C. a signal compressor, including a digital memory having an input port and an output port, for recording signals received at its input port and generating at its output port time-compressed signals representing the recorded input signals played back at a rate faster than that at which they were recorded, the output port of said signal compressor being connected to supply the time-compressed signals to the frequency-translator input port, the difference between the times of arrival at the delay-line output port of signals caused by different-frequency signals at the signal-compressor input port thereby being greater than it would have been if the different-frequency signals had been applied directly to input port of the frequency translator.

13. A compressive-receiver circuit as recited in claim 12 wherein:
A. said delay line is a two-dimensional line having a plurality of spaced input ports and a plurality of spaced output ports arranged so that the output port having the greatest response to substantially equal but relatively delayed signals at the input terminals is determined by their relative delays; and
B. said improvement further includes a frequency translator and signal compressor associated with each input port and configured like said first-mentioned frequency translator and signal compressor to feed compressed, translated signals to their associated delay-line input port.

14. A compressive-receiver circuit as recited in claim 13 wherein the improvement comprises a plurality of time compressors associated with each delay-line input port and configured like said first-mentioned time compressor to feed compressed signals to the frequency translator associated with the associated delay-line input port, each time compressor generating its time-compressed output signal at a separate time interval, the ratio of the rate of recording of each time compressor to its read-out rate being high enough that all of the information in its recorded input signal can be fit in its compressed signal during its output time interval.

15. A compressive-receiver circuit comprising:
A. a dispersive delay line having an input port and an output port and having a substantially linear relationship between the frequency of a signal and the delay time required for that signal to travel from the input port of the delay line to its output port;
B. a signal compressor, having an output port and an input port, for recording signals occurring at its input port and generating at its output port time-compressed signals representing the recorded input signals played back at a rate faster than that at which they were recorded; and
C. a frequency translator, having an input port connected to receive signals thereon as inputs from said signal compressor, and an output port connected to supply the time-compressed frequency-translated signals to the input port of the delay line, for generating a translated signal whose frequencies differ from those of the signals at its input port by a difference frequency that is repeatedly swept at a rate corresponding to the relationship between frequency and delay-line delay so that the time-compressed signals caused by all signals of a given frequency that reach the frequency translator within a given sweep thereof arrive at the output port of the delay line at substantially the same time while those resulting from different-frequency signals arrive at different times so that the time of occurrence of an output of the dispersive delay line is an indication of the frequency content of the signals received at the frequency-translator input port and causing that output, the difference between the times of occurrence of delay-line outputs caused by different-frequency signals at the input port of the frequency translator thereby being greater than it would without the signal compressor.

16. A compressive-receiver circuit as recited in claim 15 wherein said dispersive delay line comprises a two-dimensional dispersive delay line.

17. A compressive-receiver circuit as recited in claim 1 wherein said signal compressor comprises:
a sampling circuit operatively connected to receive signals from the input port of said signal compressor; and
an analog-to-digital convector, receiving signals from said sampling circuit; and
a digital memory connected to receive digitized signals from said analog-to-digital converter.

18. A compressive-receiver circuit as recited in claim 15, further comprising:
a bandpass filter operatively connected to provide signals from said signal compressor to the input port of said frequency translator.

19. A compressive-receiver circuit as recited in claim 15 wherein said frequency translator comprises:
a swept-frequency local oscillator; and
a mixer operatively connected to the input port of said frequency translator and to said local oscillator, and operatively connected to provide signals at the output port of said frequency translator.

20. A compressive-receiver circuit as recited in claim 19 wherein said frequency translator further comprises a filter operatively connected between said mixer and the output port of said frequency translator.

21. A signal processor, comprising:
a signal compressor;
a frequency translator operatively connected to receive at least one signal from said signal compressor; and
a dispersive delay line operatively connected to receive at least one signal from said frequency translator.

22. A signal processor as recited in claim 21 wherein said signal compressor comprises a plurality of signal compressors.

23. A signal processor as recited in claim 22 wherein said dispersive delay line comprises a two-dimensional dispersive delay line.

24. A signal processor as recited in claim 22 wherein said frequency translator comprises:

a swept-frequency local oscillator; and a mixer operatively connected to receive signals from said signal compressors and said local oscillator.

25. A signal processor as recited in claim 22, further comprising:

a filter operatively connected between said signal compressors and said frequency translator.

26. A signal processor as recited in claim 22, further comprising:

a like plurality of filters, each filter operatively connected to a corresponding one of said plurality of time compressors.

27. A signal processor as recited in claim 22 wherein each of said plurality of signal compressors comprises:

a sampling circuit;

an analog-to-digital converter operatively connected to receive signals from said sampling circuit; and a digital memory connected to receive signals from said analog-to-digital converter.

28. A signal processor as recited in claim 22, further comprising:

control means, connected to each of said signal compressors, for staggering output signals of said signal compressors.

29. A signal processor, comprising:

a plurality of frequency translators;

a like plurality of signal compressors, each signal compressor operatively connected to receive signals from a corresponding one of said plurality of frequency translators; and a dispersive delay line.

30. A signal processor as recited in claim 29, further comprising:

a like plurality of bandpass filters, each bandpass filter operatively connected to provide signals from a different pass band to a corresponding one of said plurality of frequency translators.

31. A signal processor as recited in claim 29, further comprising:

an antenna operatively connected to provide signals to each of said frequency translators.

32. A signal processor as recited in claim 29 wherein said dispersive delay line comprises a multi-dimensional dispersive delay line.

33. A signal processor as recited in claim 29, further comprising:

control means, connected to each of said signal compressors, for staggering output signals of said signal compressors.

34. A signal processor, comprising:

a multi-dimensional dispersive delay line having a plurality of input ports and a plurality of output ports; and a plurality of input means for compressing and frequency translating signals, each input means of said plurality of input means being operatively connected to a different input port of said dispersive delay line.

35. A signal processor as recited in claim 34, further comprising:

a plurality of antenna elements of like number as said plurality of input means, each of said antenna elements operatively connected to a different input means of said plurality of input means.

36. A signal processor as recited in claim 34 wherein each of said input means comprises:

a frequency translator; and a signal compressor operatively connected to receive signals from said frequency translator.

37. A signal processor as recited in claim 34 wherein each of said input means comprises:

a plurality of frequency translators;

a like plurality of signal compressors, each signal compressor operatively connected to receive signals from a corresponding one of said plurality of frequency translators; and a like plurality of bandpass filters, each bandpass filter operatively connected to provide signals from a different pass band to a corresponding one of said plurality of frequency translators.

38. A signal processor as recited in claim 34 wherein said multi-dimensional dispersive delay line comprises a two-dimensional dispersive delay line.

39. A signal processor as recited in claim 34, further comprising:

control means, connected to each of said input means, for staggering output signals of said plurality of input means.

40. A compressive-receiver circuit comprising:

A. a dispersive delay line having an input port and an output port and having a substantially linear relationship between the frequency of a signal and the delay time required for that signal to travel from the input port to the output port; and B. an input circuit including a plurality of frequency translators and a like plurality of time compressors in series for generating and applying to the input port of said delay line a like plurality of outputs generated by time compressing a like plurality of input signals and frequency translating them by a frequency that sweeps repeatedly at such a rate that all components of each output signal derived from a given frequency component of a corresponding input signal and translated during a given sweep of the corresponding frequency translator arrive at the output port of the delay line at substantially the same time while those derived from different frequency components arrive at different times, the difference between the times of arrival at the delay-line output port of signals caused by different-frequency signals at the signal-compressor input port thereby being greater than it would be without the time compression.

41. A compressive-receiver circuit as recited in claim 40 wherein said frequency translator and said time compressor are connected in series such that the output of said frequency translator is connected to the input of said time compressor.

42. A compressive-receiver circuit as recited in claim 41 wherein said input circuit further comprises a like plurality of bandpass filters each operatively connected to the input of a said frequency translator.

43. A compressive-receiver circuit as recited in claim 42 wherein each said frequency translator comprises:

a swept-frequency local oscillator; and a mixer operatively connected to receive signals from said bandpass filter and from said local oscillator, and operatively connected to provide signals to said time compressor.

44. A compressive-receiver circuit as recited in claim 43 wherein said frequency translator further comprises a filter operatively connected between each said mixer and a said time compressor.

45. A compressive-receiver circuit as recited in claim 41 wherein said input circuit comprises:

a plurality of bandpass filters;

a like plurality of frequency translators, each operatively connected to receive signals from one of said plurality of bandpass filters; and a like plurality of time compressors, each operatively connected to receive signals from one of said frequency translators, and each operatively connected to provide signals to said dispersive delay line.

46. A compressive-receiver as recited in claim 45 wherein each of said plurality of frequency translators comprises:

a swept-frequency local oscillator; and a mixer operatively connected to receive signals from said one of said plurality of bandpass filters and from said local oscillator, and operatively connected to provide signals to a corresponding one of said plurality of time compressors.

47. A compressive-receiver as recited in claim 46 wherein each of said plurality of frequency translators further comprises a filter operatively connected between said mixer and said corresponding one of said plurality of time compressors.

48. A compressive-receiver circuit as recited in claim 40 wherein said dispersive delay line comprises a multi-dimensional dispersive delay line.

49. A compressive-receiver circuit as recited in claim 40, further comprising:

control means, connected to said input circuit, for staggering output signals of said input circuit.

* * * * *